(12) United States Patent
Yamamoto

(10) Patent No.: US 10,136,632 B2
(45) Date of Patent: Nov. 27, 2018

(54) MODIFIED FIELD INCINERATING ARRANGEMENT

(71) Applicant: Jiro Yamamoto, Torrance, CA (US)

(72) Inventor: Jiro Yamamoto, Torrance, CA (US)

( * ) Notice: Subject to any disclaimer, the term of this patent is extended or adjusted under 35 U.S.C. 154(b) by 448 days.

(21) Appl. No.: 14/999,467

(22) Filed: May 12, 2016

(65) Prior Publication Data

US 2017/0328563 A1 Nov. 16, 2017

(51) Int. Cl.
| | | |
|---|---|---|
| *A01M 15/00* | (2006.01) | |
| *F23D 99/00* | (2010.01) | |
| *F23D 14/56* | (2006.01) | |
| *F23D 14/38* | (2006.01) | |
| *F23D 14/02* | (2006.01) | |
| *A01B 45/00* | (2006.01) | |
| *F23G 5/40* | (2006.01) | |
| *F23G 7/10* | (2006.01) | |
| *A01C 21/00* | (2006.01) | |

(52) U.S. Cl.
CPC ............. *A01M 15/00* (2013.01); *A01B 45/00* (2013.01); *A01C 21/00* (2013.01); *F23D 14/02* (2013.01); *F23D 14/38* (2013.01); *F23D 14/56* (2013.01); *F23D 91/02* (2015.07); *F23G 5/40* (2013.01); *F23G 7/10* (2013.01)

(58) Field of Classification Search
CPC ......... A01M 15/00; A01M 21/04; F23G 7/10; F23G 5/40; F23G 2209/26; F23D 14/56; A01B 45/00
See application file for complete search history.

(56) References Cited

U.S. PATENT DOCUMENTS

| | | |
|---|---|---|
| 88,122 A | 3/1869 | Miles |
| 148,757 A | 3/1874 | Mccrossan |
| 164,158 A | 6/1875 | Brashears et al. |
| 189,832 A | 4/1877 | Hoek et al. |
| 203,254 A | 5/1878 | Downing |
| 239,030 A | 3/1881 | Benson |
| 261,139 A | 7/1882 | Pogue |
| 262,476 A | 8/1882 | Bentnati |
| 323,720 A | 8/1885 | Moore, Jr. |
| 351,144 A | 10/1886 | Bentnati |
| 431,096 A | 7/1890 | Engelke et al. |
| 533,577 A | 2/1895 | Ainger |
| 542,498 A | 7/1895 | Forbes |
| 553,415 A | 1/1896 | Harvey et al. |
| 626,087 A | 5/1899 | Lompa |
| 655,082 A | 7/1900 | Paltin et al. |
| 799,035 A | 9/1905 | Benien et al. |
| 802,020 A | 10/1905 | Stone et al. |

(Continued)

FOREIGN PATENT DOCUMENTS

GB         2244633      12/1991

OTHER PUBLICATIONS

U.S. Appl. No. 10/855,701, Carroll.
(Continued)

*Primary Examiner* — David J Laux
(74) *Attorney, Agent, or Firm* — Clement Cheng

(57) ABSTRACT

A mobile vehicle having a burner assembly for movement over a ground surface and directing flame onto the ground surface to incinerate the materials on the ground surface and growing therefrom and including a water spray for reducing air pollution associated with the incineration.

20 Claims, 10 Drawing Sheets

(56) References Cited

U.S. PATENT DOCUMENTS

| | | | |
|---|---|---|---|
| 833,013 A | 10/1906 | Davis | |
| 1,399,529 A | 12/1921 | Stewart | |
| 1,458,070 A | 6/1923 | Long et al. | |
| 1,571,481 A | 2/1926 | Kasmeir | |
| 1,571,883 A | 2/1926 | Belanger | |
| 1,707,845 A * | 4/1929 | Caswell | A01M 15/00 126/271.2 A |
| 1,709,270 A | 4/1929 | Lang | |
| 1,799,035 A | 3/1931 | Benien et al. | |
| 1,843,187 A | 2/1932 | Wood | |
| 1,957,290 A | 5/1934 | Railing | |
| 1,982,646 A | 12/1934 | Dick | |
| 1,991,930 A | 2/1935 | Hope | |
| 2,051,684 A | 8/1936 | Dick | |
| 2,370,008 A | 2/1945 | Christenson | |
| 2,523,953 A | 9/1950 | Johnson | |
| 2,563,926 A | 8/1951 | Elliott et al. | |
| 2,682,728 A | 7/1954 | Nisbet et al. | |
| 2,694,393 A | 11/1954 | Simpson | |
| 2,858,755 A | 11/1958 | Toulmin, Jr. | |
| 2,920,433 A | 1/1960 | Brady | |
| 2,966,128 A | 12/1960 | Toulmin | |
| 2,987,868 A | 6/1961 | Cunningham | |
| 3,183,650 A | 5/1965 | Ferris | |
| 3,362,397 A | 1/1968 | Murphy | |
| 3,443,885 A | 5/1969 | Scholtus | |
| 3,477,174 A | 11/1969 | Lalor | |
| 3,559,337 A | 2/1971 | Marcoux et al. | |
| 3,606,877 A * | 9/1971 | Shipp | A01M 15/00 110/212 |
| 3,698,380 A | 10/1972 | Cook | |
| 3,785,303 A | 1/1974 | Hopkins | |
| 3,802,020 A | 4/1974 | Stone et al. | |
| 3,805,766 A | 4/1974 | Hammon | |
| 3,809,060 A | 5/1974 | Shirley et al. | |
| 3,935,670 A | 2/1976 | Pluenneke et al. | |
| 3,973,354 A | 8/1976 | Schommer | |
| 4,034,739 A | 7/1977 | Boekelman | |
| 4,088,122 A | 5/1978 | Miles | |
| 4,239,030 A | 12/1980 | Benson | |
| 4,291,125 A | 9/1981 | Greatbatch | |
| 4,420,901 A | 12/1983 | Clarke | |
| 4,688,494 A | 8/1987 | Domnitch | |
| 4,869,235 A * | 9/1989 | Miles | A01M 21/04 126/271.2 R |
| 4,873,789 A | 10/1989 | Plattner | |
| 5,020,510 A | 6/1991 | Jones | |
| 5,189,832 A | 3/1993 | Hoek et al. | |
| 5,217,688 A | 6/1993 | Von Lersner | |
| 5,305,584 A | 4/1994 | Hessebi | |
| 5,366,154 A | 11/1994 | Thompson | |
| 5,406,747 A | 4/1995 | Kiefl | |
| 5,430,970 A | 7/1995 | Thompson | |
| 5,433,758 A | 7/1995 | Thompson | |
| 5,553,414 A | 9/1996 | Chapman | |
| 5,553,415 A | 9/1996 | Harvey | |
| 5,575,111 A | 11/1996 | Rajamannan | |
| 5,626,087 A | 5/1997 | Lompa | |
| 5,682,707 A * | 11/1997 | Chastain | A01M 15/00 47/1.44 |
| 5,727,484 A | 3/1998 | Childs | |
| 5,776,422 A | 7/1998 | Kawasaki | |
| 6,029,589 A | 2/2000 | Simpson | |
| 6,363,654 B2 | 4/2002 | Prull | |
| 7,954,276 B1 | 6/2011 | Jackson | |
| 2005/0262761 A1 | 12/2005 | Carroll | |

OTHER PUBLICATIONS

NSW EPA, "Stormwater management for golf courses".
Robert A. Pence, "Breathing easier: Overseeding and dust affect the Coachella Valley Turf industry." California Fairways; Jan. 1, 2002. Adams Business Media.
2000 Annual Research Summary, UCRTRAC Accumulative Research Summary, Section G: The ability to sudden research and education industry needs—project 1.
Robert Green, Dennis Fitz in cooperation with Mike Kocour The Springs Club, "Final Report—The effect of fall renovation treatments on PM10 emissions during raking of debris following scalping of common bermudagrass fairways prior to overseeding" Aug. 22, 2000. Coachella Valley and County of Riverside.
Dennis Fitz, "Evaluation of fugitive dust technology for lawn raker-Final Report" Aug. 14, 1998. University of California, Riverside.
AQMD, "Rule 444. Open Burning" 1976-2001.

* cited by examiner

MODIFIED FIELD INCINERATING ARRANGEMENT

BACKGROUND OF THE INVENTION

Field of the Invention

This invention relates to the field conditioning art and more particularly to a mobile vehicle for providing a substantial incineration of growing matter on a field and the subsequent utilization of the material that has been incinerated as a fertilizing agent on the field.

Description of the Prior Art

The control of growing materials such as grass, weeds and the like on various fields is often performed on a periodic basis. Many procedures of such control that have heretofore been utilized involved cutting of the growing material close to the ground level. Such cutting of the growing materials, however not only left many of the roots of the, for example, existing grass and weeds in place, but also required appropriate disposal of the cut materials. One method of such disposal that is heretofore been utilized involved the sweeping up of the cut materials, packaging such swept up cut materials in bags or other transportable containers and transporting such bags or containers to an appropriate green waste facility. This method of control has not proven to be completely satisfactory in many applications as not only are some of the roots of the previous growth of grass, weeds and the like left in place for subsequent growth the following season, but also the seeds of the grass, weeds and the like were left intact as were many insect, the eggs of insects, and other undesirable materials that may have been in place on the field. The subsequent re-seeding of the field with new grass seeds often did not provide a uniform and consistent field for the next season utilization of the field. Further, the cost associated with the gathering together and disposal of the cut materials was an added cost above and beyond the costs associated with the cutting of the growing material. Additionally, this method of control often resulted in the generation of dust, air pollution such as pollen and the like. This method of control has often been heretofore utilized in applications such as golf courses and other large areas of growing material that is to be controlled. It is been found, however, that often two or even four weeks were required between the cutting operation and the re-seeding operation in order that proper growth of the newly seeded grass can germinate and grow for the next season.

Other locations of fields in which the growing material was to be controlled often involve control of growing materials on highway dividers and areas along the sides of such highways. In such areas associated with highways and the like, very often chemicals were utilized to control the growing materials. However, many municipalities and other governmental agencies have disallowed the use of chemicals for such control of growing materials along highways.

Thus, there has long been in need for a control arrangement which not only removes the existing grass and weeds but also removes the seeds thereof as well as insects, the eggs of insects, and other foreign material present on the held by a substantial incineration thereof, but also leaving the incinerated remains of the materials in situ not only to avoid the environmental contamination as well as minimize the costs associated with such control.

Accordingly, it is an object of the present invention to provide a control of growing materials on a field by incinerating much of the cut materials and leaving the remains of the incinerated materials in situ.

It is another object of the present invention to provide an improved control of growing materials by substantial incineration of the materials on the field and yet minimizing undesired and environmental effects associated with the control method.

It is yet another object of the present invention provide an improved control of growing materials on the field that is cost effective even for comparatively large fields such as golf courses and the like.

SUMMARY OF THE INVENTION

The above and other objects of the present invention are achieved by providing a mobile vehicle. The mobile vehicle may be a towed vehicle or self-propelled vehicle. However, for convenience of illustration, the present invention is described herein as incorporated in a towed vehicle but the invention is not so limited.

The mobile vehicle is provided with a chassis having wheels for supporting the chassis on the field over which the mobile vehicle moves. The wheels comprise a pair of front wheels and a pair of back wheels all of which are rotatably mounted on the chassis. The chassis has a forward end and a rear end. The forward end of the vehicle is provided with a tow bar which may be attached to any desired powered vehicle for pulling the chassis on the field. A source of fuel such as liquified petroleum gas (LPG) such as propane under pressure is contained in a tank arrangement mounted on the powered vehicle and the source of fuel is operatively connected by a flexible hose to a burner assembly mounted on the chassis. The LPG tank on the powered vehicle is spaced from the burner assembly which is mounted on the forward end of the chassis by a preselected distance of at least 10 feet.

The burner arrangement is provided with an air blower which may also be mounted on the chassis in regions adjacent to the forward end thereof for blowing air into the burner assembly. In preferred embodiments of the present invention the air blower is connected to the burner assembly by a flexible conduit. The burner assembly also receives the liquified petroleum gas and mixes the air and LPG together to provide a combustible mixture. The burner assembly and associated structures such as carburetor, flow control for the LGP, and the like are also mounted on the chassis and operatively connected to the burner assembly and associated structure for control of the liquified petroleum gas and the air flow.

The lower end of the burner assembly is provided with a fuel nozzle array for discharging the combustible mixture of LPG and air in regions beneath a lower portion of the chassis and in incineration relationship to the materials on the ground level. In preferred embodiments of the present invention, the burner assembly is rotatably mounted on the chassis for limited pivotal movement thereon about a horizontal transverse axis perpendicular to the longitudinal separation of the forward end of the chassis and the rear end of the chassis so that the flame from the nozzles is movable from a lower position which may be on the order of 12 inches from the ground surface on which the chassis is positioned to a higher position which may be on the order of 24 inches from the ground surface. An igniter is mounted on the chassis in operable relation to the fuel nozzle array for providing ignition of the combustible mixture air and LPG as it exits the fuel nozzle array. The fuel nozzle array extends transversely across the width of the chassis.

A water tank is mounted on the chassis for containing a preselected volume of water. The water tank has a plurality of walls defining a volume for storage of the water in the volume formed by the plurality of walls. The plurality of walls may include a front wall, a pair of opposed transversely spaced apart side walls, a bottom wall, a top wall spaced vertically above the bottom wall and a back wall spaced longitudinally from the front wall to define the enclosed water storage volume. The front wall of the water tank is positioned in regions adjacent the burner assembly and nozzle array at the forward end of the chassis and the bottom wall of the water tank extends from the forward end of the chassis longitudinally and upwardly to the back wall of the water tank and the back wall of the water tank is positioned in regions adjacent the back end of the chassis. The bottom wall of the water tank at the back wall is spaced vertically a greater distance from the ground surface than the bottom edge of the front wall of the water tank to provide a progressively larger separation between the ground level and the bottom wall of the water tank. The incinerating area of the field having the vegetation and other material to be incinerated is the area that at any given time is the area which lies beneath the bottom wall of the water tank, between the side edges of the chassis and between the front wall of the water tank and the back wall of the water tank.

In preferred embodiments of the present invention, the inner surface of the bottom wall of the water tank that is, the surface facing the ground level, is provided with a ceramic coating. The ceramic coating radiates eight towards the incinerating area of the ground surface to for additional incineration effect of the vegetation materials to be incinerated. Thus, while the flame of the combustible materials emanating from the nozzle array may have a temperature on the order of 750° F., the temperature of the coating on the bottom wall of the water tank may be on the order of 1000° F. to 2500° F.

The combustion volume is defined as the volume between the fuel nozzle array and the back wall of the water tank and the sides of the chassis. As noted above, the combustion volume is generally wedge shaped and extends between the sides of the chassis and has a smaller vertical dimension at the forward end of the chassis and a larger vertical dimension at the rear end of the chassis.

The chassis is also provided with a bottom frame that has side frame members extending along the sides of the chassis, a front frame member connected to the side frame members at the forward end of the chassis and a rear frame member connected to the side frame members at the back end of the chassis and the bottom frame has external surfaces facing outwardly from the chassis and internal surfaces facing inwardly. The internal surfaces of the bottom frame defined, substantially, the incinerating area of the ground level.

A skirt arrangement is coupled to the outside surface of the bottom frame and extends downwardly towards the ground level therefrom. In preferred embodiments of the present invention the skirt arrangement is flexible and the lower edge of the skirt arrangement is positioned in close proximity to the ground level. The skirt arrangement tends to keep the products of combustion generated within the combustion volume from being transmitted to regions external the chassis. The flexibility of the skirt arrangement allows the lower edge of the skirt arrangement, date various surface irregularities in the ground as the chassis is there on.

A filter box is positioned at the back end of the combustion volume and extends towards the ground surface so that the combustion gases may exit thr combustion volume therethrough. The combustion gases from the combustion generated by the flames at the nozzle array as well as any particulate matter from the incineration of the vegetation and other combustible materials on the ground surface flow through the exhaust along a flow path from the nozzle array to the filter box and exit to the atmosphere through the filter box. Since the volume of the exhaust flow path increases progressively greater from the front end of the chassis to the rear end of the chassis, the pressure of the exhaust gas as well as the velocity of the exhaust gas flow progressively decreases in the longitudinal direction from the front end of the chassis to the rear end of the chassis and the filter box is more efficient at removing particulate matter contained in the exhaust gas flow.

A water pump is mounted on the chassis at the forward end thereof and is connected to the water tank for pumping water therefrom. An external water manifold which, for example may be a pipe, is mounted on the external surface of the side members of the bottom frame and extend from the forward end of the chassis to the rear and the chassis. A plurality of water nozzles are mounted on the external water manifold in a spaced apart longitudinal array and are in water flow communication with water contained therein. The plurality of water nozzles is aimed towards the ground level and is provided to wet down any particulate matter that may escape from the combustion volume between the bottom edge of the skirt arrangement and the ground level so that pollution of the atmosphere external the chassis is minimized.

A misting nozzle arrangement is mounted within the chassis above the filter box and the misting nozzle arrangement has a misting manifold to which there is attached a plurality of transversely spaced apart misting nozzles aimed downwardly towards the ground level for entrapping particulate matter in the exhaust gas flow and directing any such particulate matter to the ground level. As the chassis is moved on the ground level the water flow from the misting nozzles and the water flow from the water nozzles wets down both the incinerated area of the ground surface and the ground surface immediately adjacent to the sides of the chassis. Such water flow minimizes flow of particulate matter into the atmosphere both during the combustion process and after the chassis is moved along the ground surface.

In a preferred embodiment of the present invention the flexible skirt arrangement is comprised of a multi-layer structure and may have a flexible outer layer on the external side thereof and a flexible inner layer on the inner side thereof. The flexible outer layer may be, for example, rubber, thin copper sheeting or the like. The flexible inner layer may be, for example silicone. The silicone inner layer can withstand temperatures in the range 1500° F. to 2000° F. and wall radiate heat inwardly of the chassis to aid in the incineration of the materials on the ground surface.

It has been found that in order to obtain the maximum benefit from the incineration process performed by the device described herein, it is often desirable to prepare the ground that is to be incinerated that is, it has been found that a three-day procedure is most efficient for obtaining the maximum benefits. In this three-day procedure is been found that on day one there is the first vertical cut of the growing vegetation. On day two there is the second vertical cut of the growing vegetation and then removal of the debris from the surface of the field to be incinerated. On day three the incineration process may be performed.

In operation of the device to perform the incineration process utilizing the invention described herein, the mobile vehicle is positioned at an initial location on the surface of the ground which is to be incinerated. The air blower and the fuel pump are made operational to provide the combustible mixture of all and air in the burner assembly and the combustible mixture is ignited as it leaves the fuel nozzle array. The water pump is activated to pump the water from the water tank into both the external water manifold to provide the spraying of water from the plurality of water nozzles and also to the misting manifold to provide the flow of misting water from the plurality of misting nozzles located thereon. The mobile vehicle is moved in a desired pathway covering the ground surface that is to be provided with incineration of the materials thereon.

The seeding of the field with new grass seed and the watering thereof may be accomplished immediately after the incinerating process when the "three day" process is followed.

The benefits of the incineration process by the machine described herein and in accordance with the above described three-day procedure, there is a saving of both time and money associated with providing the new growth of, for example, grass. Further, the operation as above described significantly reduces the PM pollutants from the environment. Further, by operating on clean burning liquified petroleum gas the pollutants associated with the burning are eliminated. The incinerated waste acts as a natural fertilizer for the new growth and thus reduces the need for chemical fertilizers. The incineration process described herein kills harmful six, the eggs of such insects, weed seeds, and many lawn diseases thus using or illuminating the need for utilization of pesticides.

BRIEF DESCRIPTION OF THE DRAWING

The above and other embodiments of the present invention my be more fully understood from the following detailed description taken together with the accompanying drawing wherein similar reference characters refer to similar elements throughout and in which.

DESCRIPTION OF THE PREFERRED EMBODIMENTS

Figure 1:
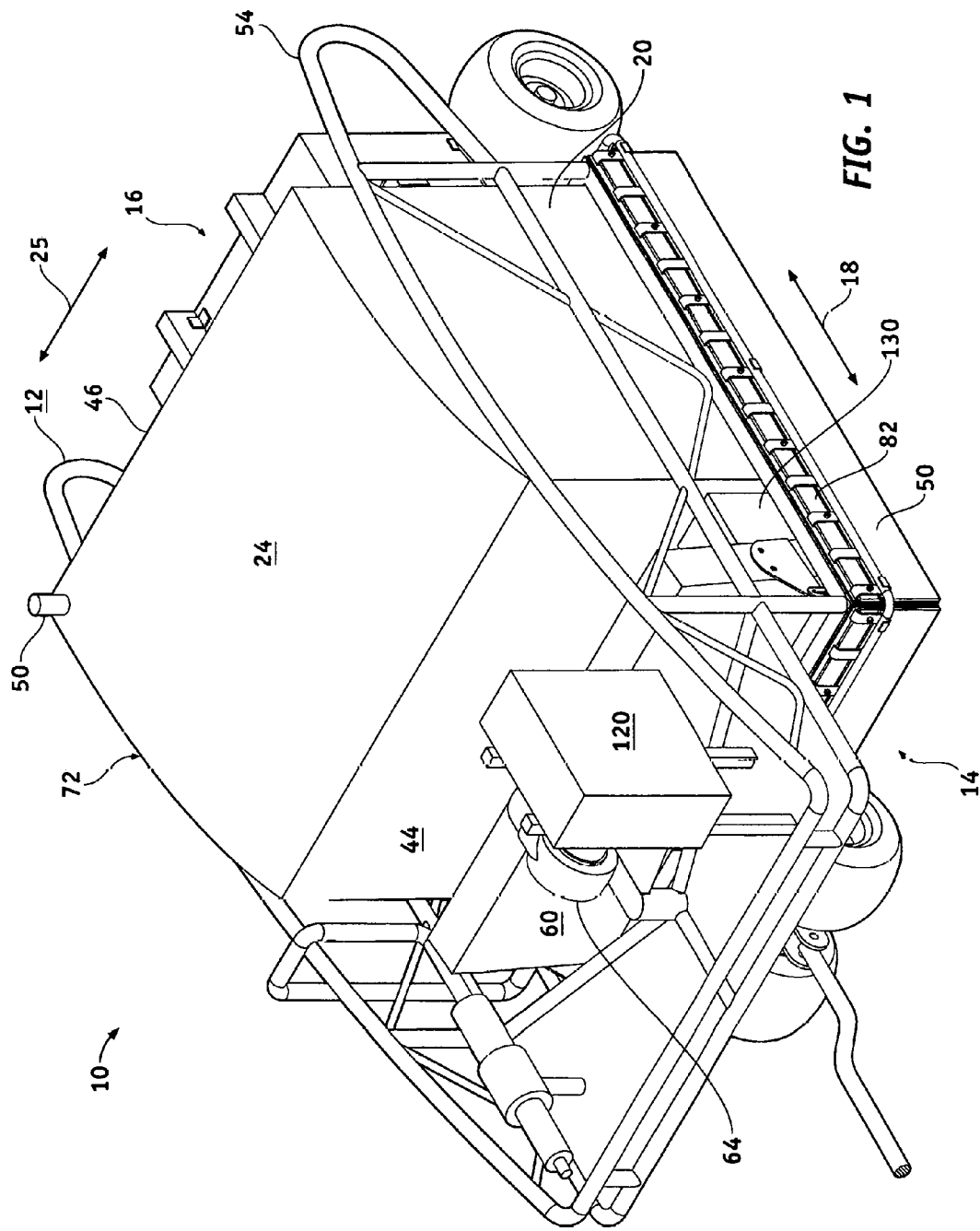
FIG. 1 is a front perspective view embodiment the present invention of a mobile field incinerating arrangement.
Figure 2:
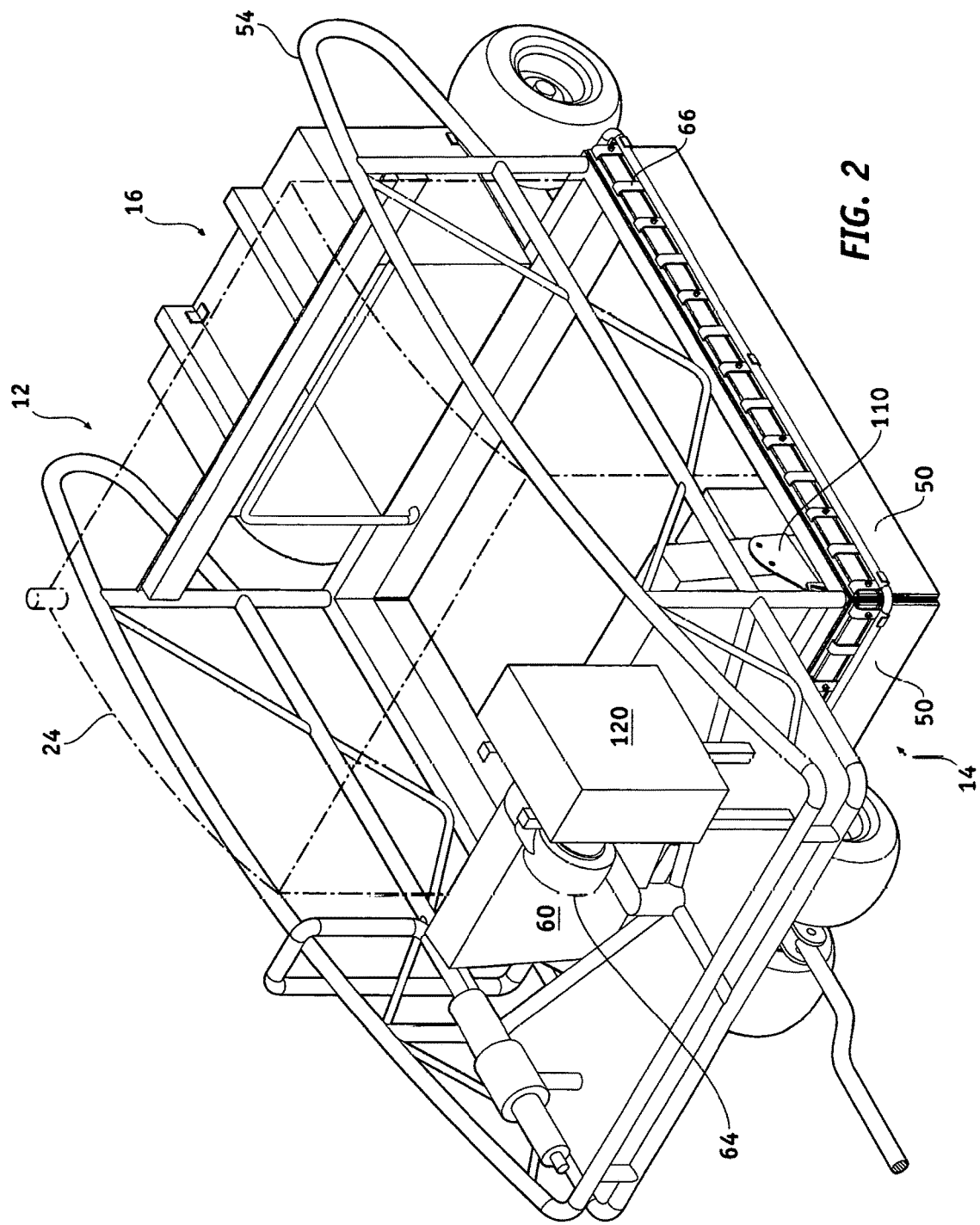
FIG. 2 is a perspective view of the embodiment of FIG. 1 with the water tank removed and shown in phantom lines thereon to show additional structural details.

Referring now to the drawing, there is illustrated in the various Figures thereof a preferred embodiment generally designated 10 of the present invention of a mobile field incinerating arrangement. As shown in the figures the embodiment 10 illustrates the principles of the present invention as incorporated in a towed vehicle. However, the present invention is not so limited as it may be also incorporated advantageously in a self propelled vehicle arrangement. FIG. 1 is a front back to you of the embodiment 10 having a chassis generally illustrated at 12 which has a forward end indicated at 14 and a rear end indicated at 16 The forward end 14 is spaced longitudinally from the rear end 16 as illustrated by the arrow 18. The chassis 12 also has a pair of side panels 20 and 22 spaced transversely apart as indicated by the arrow 25 and the side panels extend generally from regions adjacent the rear end 16 and the front end 14.

The chassis 12 defines a substantially open chassis volume 28 between the forward end 14 and the rear end 16. A water tank 24 is positioned in the open volume 28 of the chassis 12. As shown most clearly in FIG. 9, the water tank 24 contains water 30 and has an upper surface 32 and a lower surface 34. The lower surface 34 of the water tank 24 extends generally upwardly from the forward end 14 of the chassis 12 towards the rear end 16 of the chassis 12. The volume between the lower surface 34 of the water lank 24 and the ground surface 40 may be considered to be the incinerating volume 42 and as shown most clearly in FIG. 9 the incinerating volume 42 is generally wedge shaped having a smaller cross-sectional area at the forward end 14 then the cross-sectional area at the rear end 16. The water tank 24 also has a front wall 44 and a rear wall 46. An appropriate thing height 50 is provided to allow access from the interior of the water tank 24 to regions external the water tank 24 to allow the flow of air into and out of the interior volume of the water tank 24. The bottom surface 34 of the water tank 24 may, if desired, be provided with a ceramic coating 34' in opposed relationship to the ground surface 40.

A burner assembly generally designated 60 is mounted on the forward end 14 of the chassis 12 and the burner assembly 60 has a mixing chamber 62, a conventional air blower asked the four connected by an appropriate duct six which if desired may be flexible, which feeds air into the mixing chamber 62. In preferred embodiments of the present invention the burner assembly also includes liquefied petroleum gas such as propane in tanks 70 and a flexible hose 72 is provided to conduct the liquefied petroleum gas such as propane from the tanks 70 into the mixing chamber 62 as indicated at 66 on FIG. 9. The flow of air as indicated at 68 mixes with the liquefied petroleum gas and in operation forms a combustible mixture as indicated by the pictorial representation of the flames at 70. The flames 70 are in incinerating relationship to the ground surface 40 and as the chassis 12 is moved in the direction indicated by the arrow 80 as shown on FIG. 9 the ground 40 is sequentially incinerated to burn not only vegetation growing in the ground 40 but also any insects, seeds, larvae and the like. The ceramic coating which may be applied to the underside of the lower surface 34 of the water tank 24 provides reflected heat back towards the ground surface 42 to increase the effectiveness of the incineration process.

In order to reduce pollution resulting from the incineration of the materials located on the ground surface 40 as provided by the present invention, it is been found desirable to incorporate skirts as indicated at 50 on FIG. 1 mounted on the exterior of a bottom frame 52 of the chassis 12 which is positioned vertically downwardly from the upper framework 54 of the chassis 12. Skirts 50 may extend completely around the bottom frame 52 along the sides, front and rear.

Figure 5:
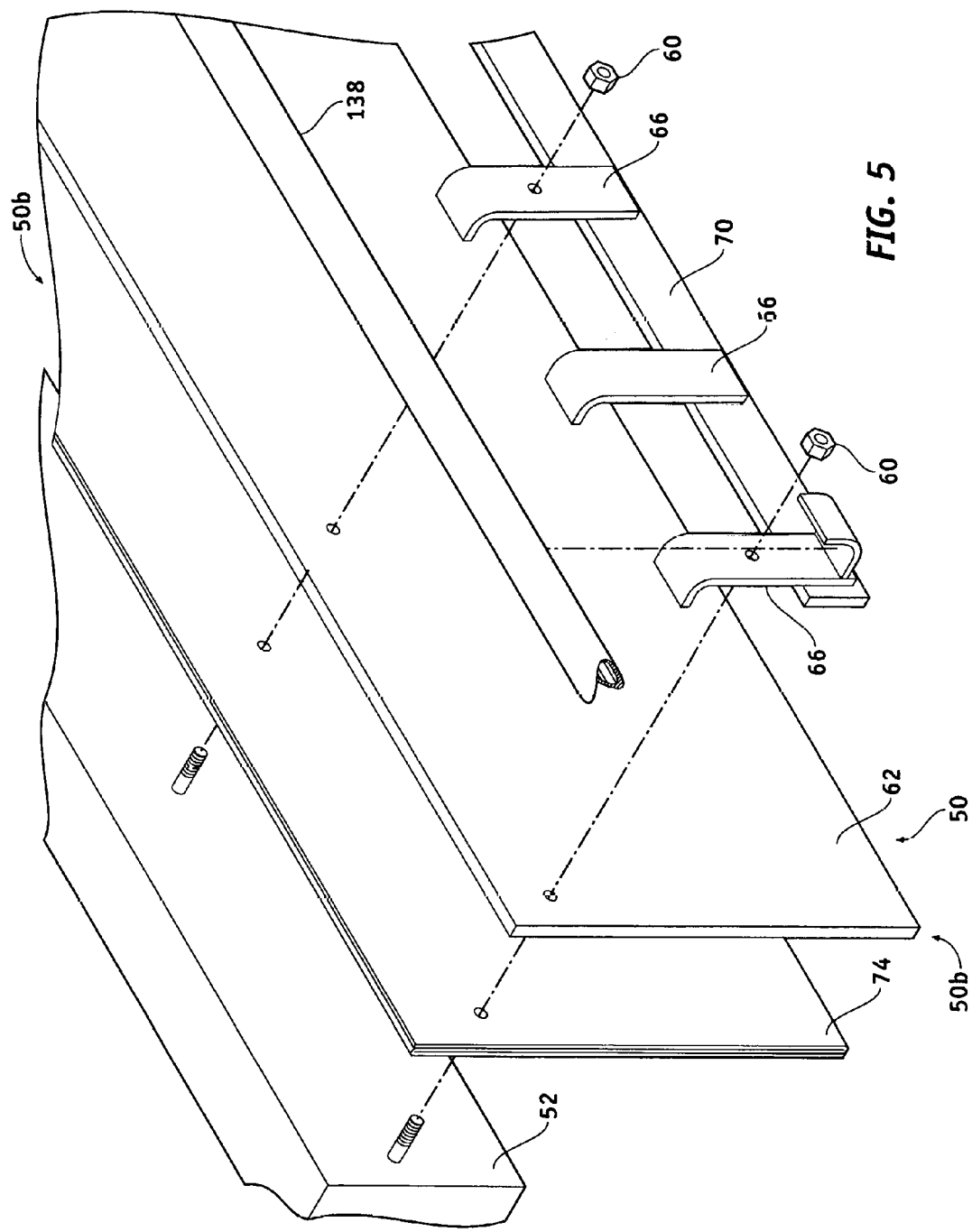
FIG. 5 is a perspective view showing the details of the side skirts useful in the practice of the present invention.
Figure 6:
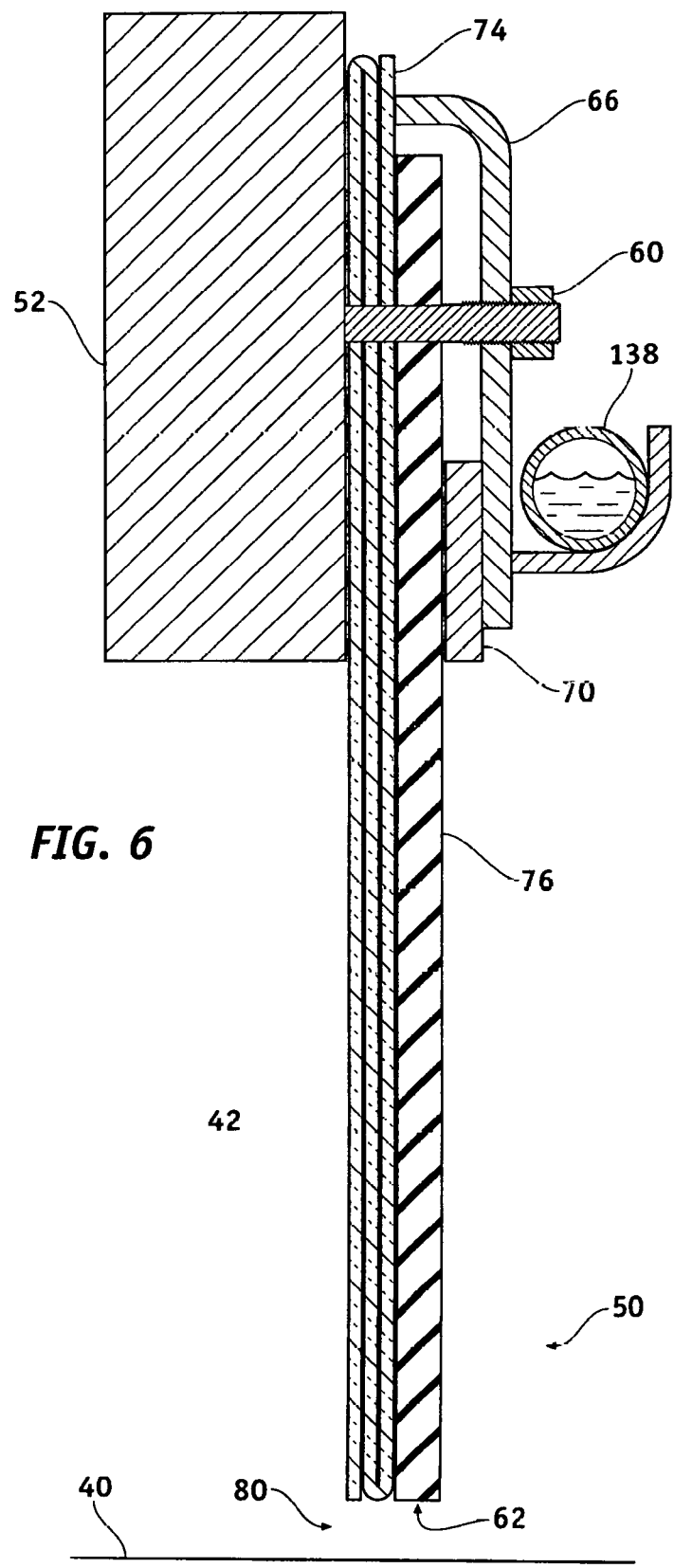
FIG. 6 is a sectional view illustrating the attachment of the side skirts the chassis of the present invention.

FIGS. 5 and 6 illustrate the preferred construction of the skirt arrangement 50 useful in the practice of the present invention. The upper portion 50a of the skirt 50 is coupled t the bottom frame 52 by, for example, bolts and nuts indicated at 60a which extended through the brackets 66 which is connected to the longitudinal support 70. A lower portion 50b of the skirt 50 is spaced vertically downwardly from the upper portion 50a and the lower portion has a bottom edge 62 which is in close proximity to the ground surface 40 as shown on FIG. 9.

Figure 7:
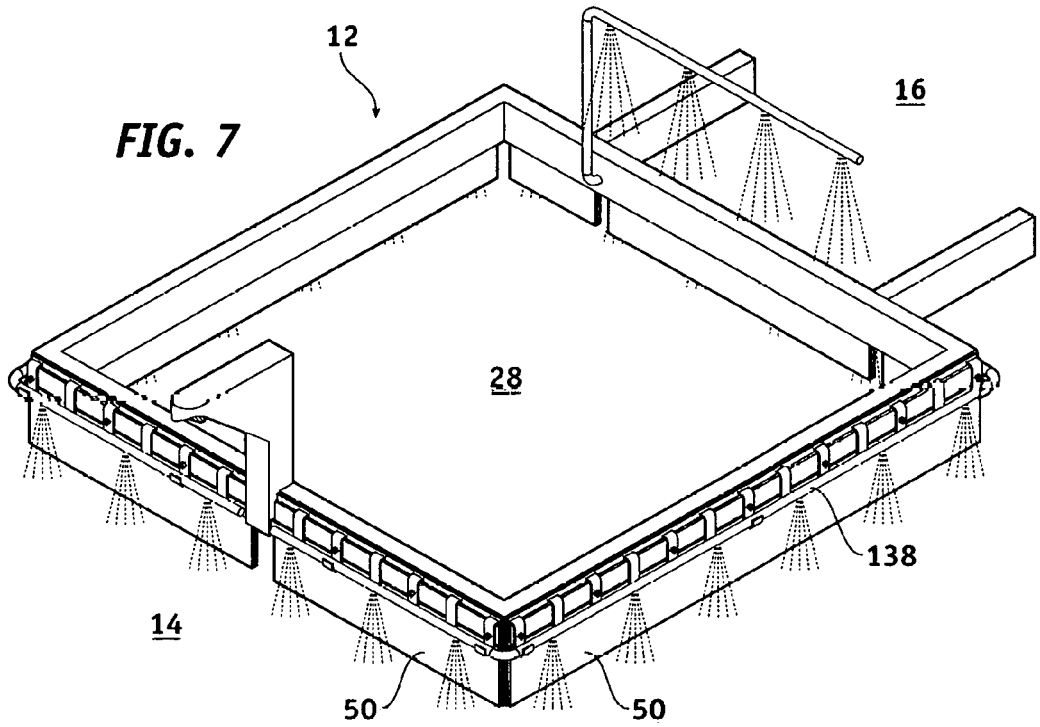
FIGS. 7 and 8 are front and rear perspective views showing the structural arrangement of the chassis of the embodiment shown in FIG. 1.
Figure 8:
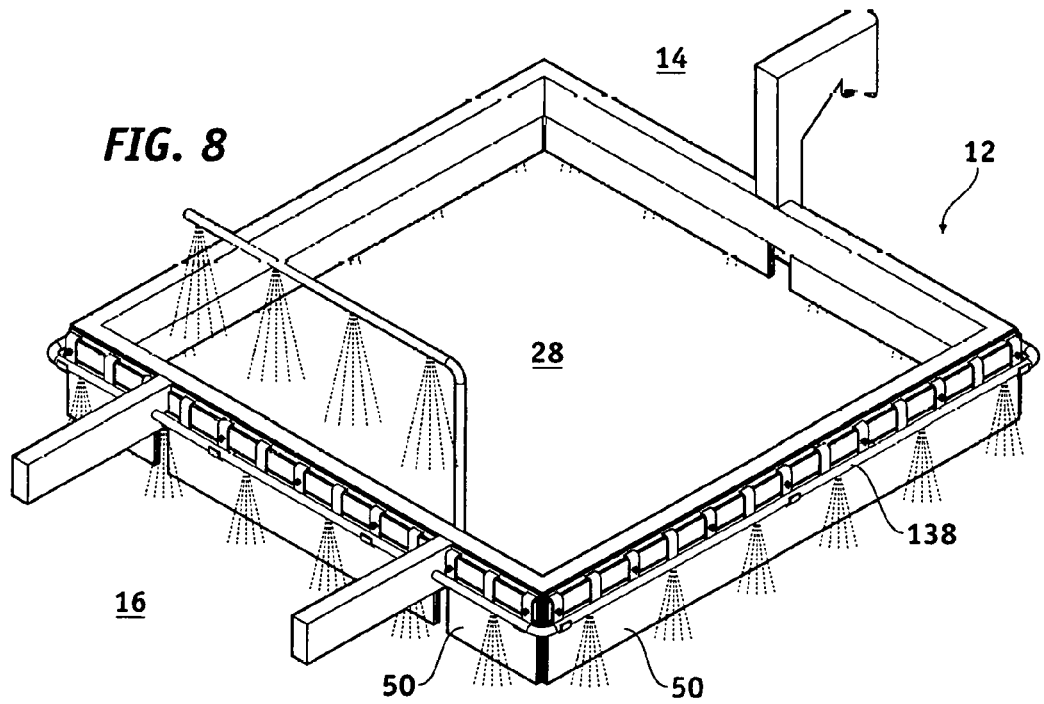

The skirt arrangement 50 is preferably flexible and may be a multilayer construction. An inner layer 74 which may be comprised one or more layers silicone and the outer layer 76 may be comprised of a flexible material such as rubber, a thin copper sheet, a thin aluminum sheet or the like. The skirt 50 tends to minimize any products of combustion generated in the combustion volume 42 from entering into regions external the chassis 12 of the present invention as indicated by the arrow 80. As noted above, the skirt 50 may also extend along the front and rear of the bottom frame 57 as indicated on FIGS. 7 and 8.

Figure 3:
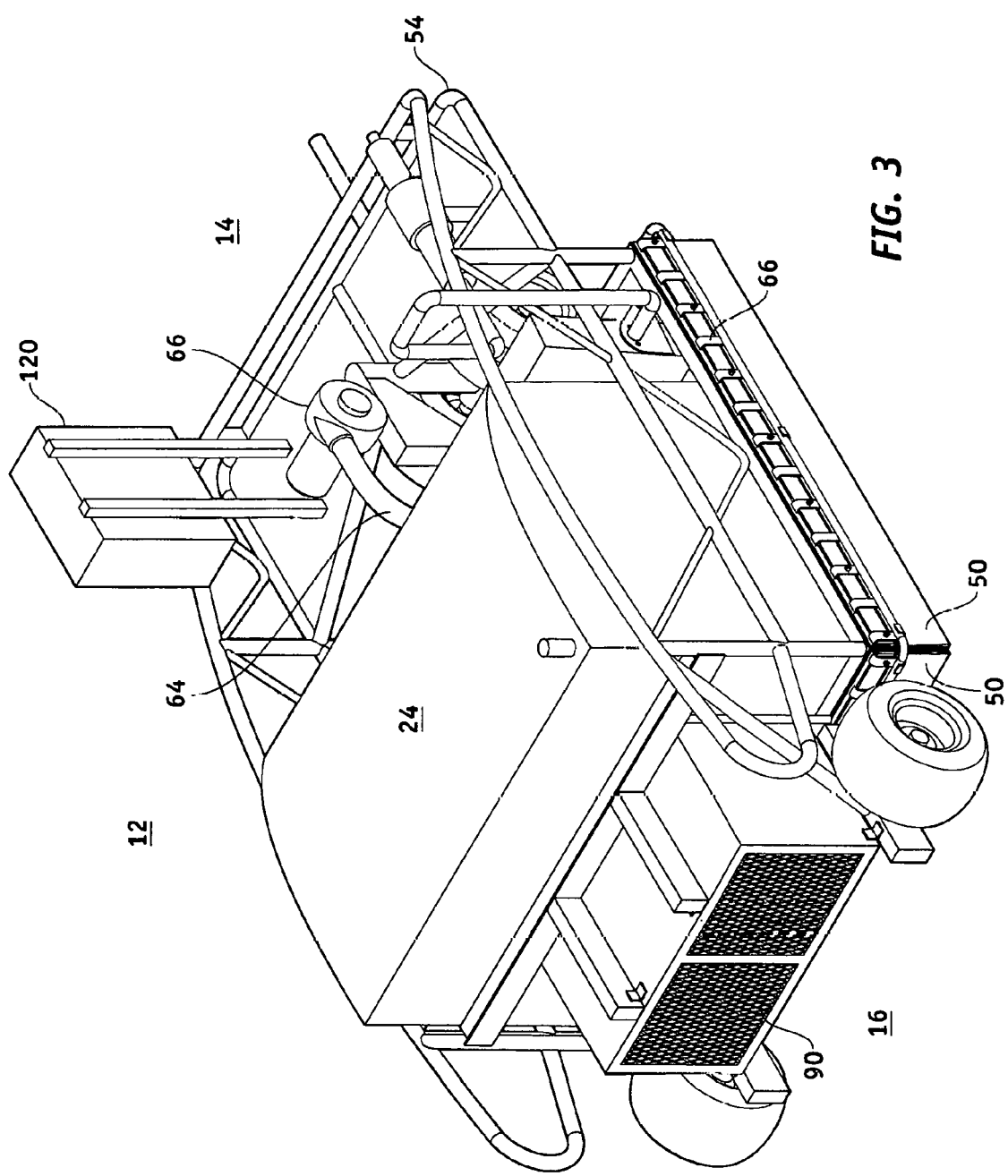
FIG. 3 is a rear perspective view of the embodiment shown in FIG. 1.
Figure 4:
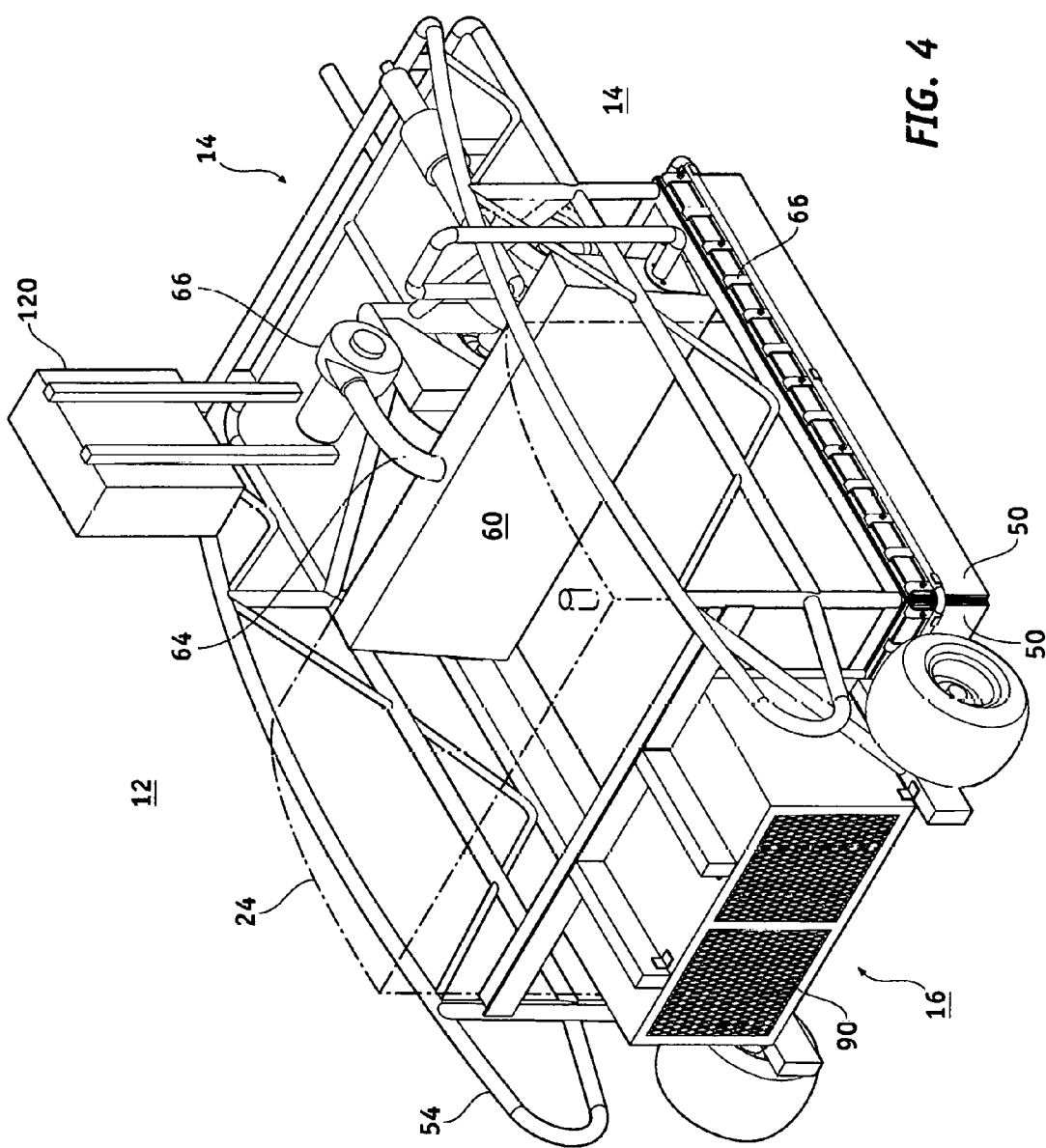
FIG. 4 is a rear perspective view of the embodiment shown in FIG. 1 with the water tank removed and shown in phantom lines thereon to show additional structural details.
Figure 9:
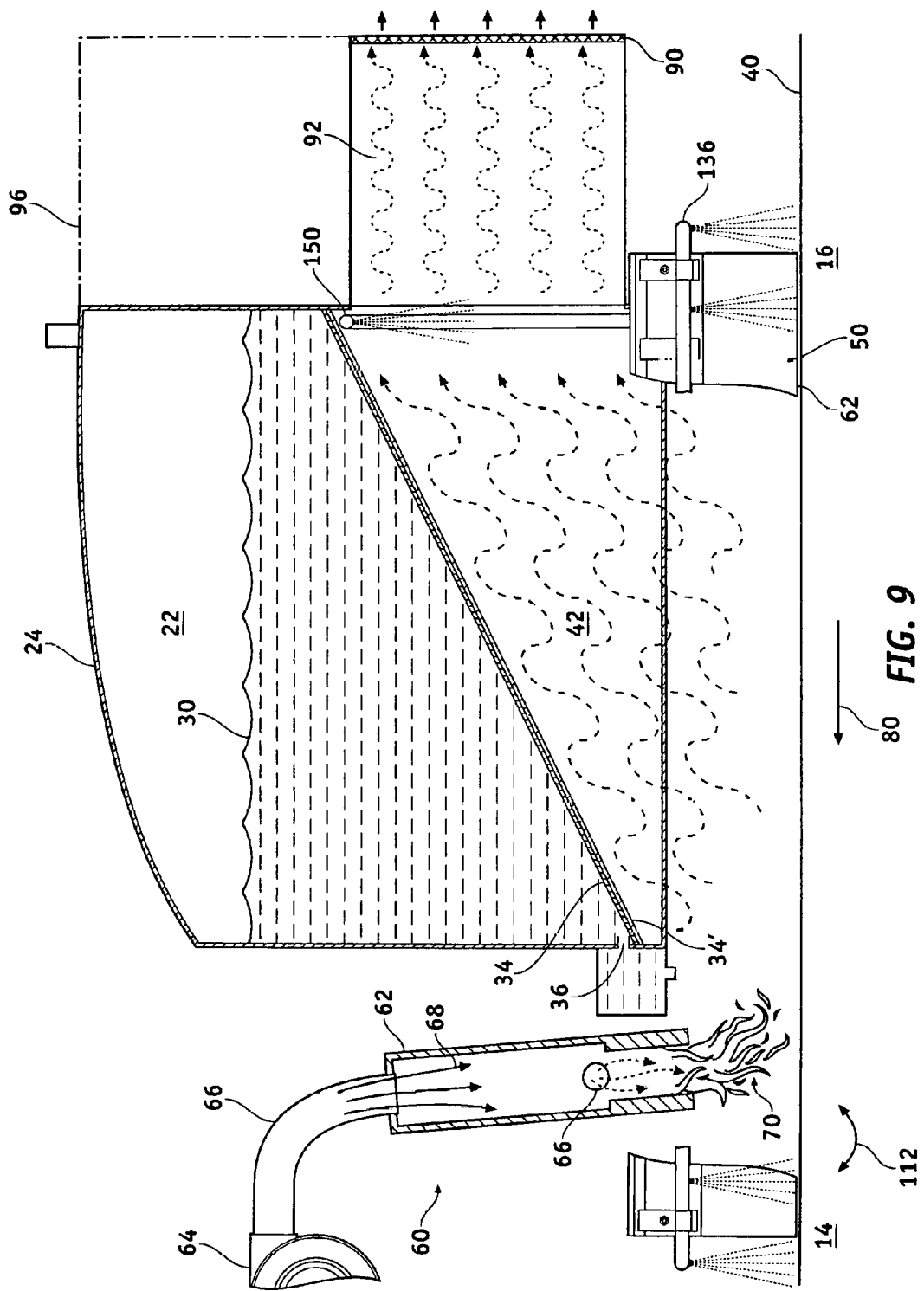
FIG. 9 is a longitudinal sectional view of the embodiment shown in FIG. 1.

As shown on FIGS. 3 and 4 a filter 90 is provided filter the flow of the combustion products generated in the combustion volume 42 as indicated at 92 on FIG. 9. As noted above the combustion volume 42 is wedge shaped having a greater cross-sectional area in regions adjacent the filter 92 that at the front end of the combustion volume 42. Because of this wedge shape the velocity of the flow of the combustion products 92 through the filter 90 is reduced thereby aiding in maintaining the products of combustion within the combustion volume 42.

As shown in FIG. 9, in some embodiments of the present invention the water tank 24 may be extended over filter 92 as indicated by the phantom lines at 96 to increase the volume of water contained in the water tank 24.

The burner 60 may be pivotally mounted on the chassis 12 by brackets 110 to allow for limited pivotal motion as indicated by the arrow 112 to remove the flame indicated at 70 closer to or further from the ground surface 40 during the incineration of the products on the ground surface 40.

A control box 120 may be included on the chassis 12 to contain the various controls necessary for operation of the incineration arrangement of the present invention.

Figure 10:
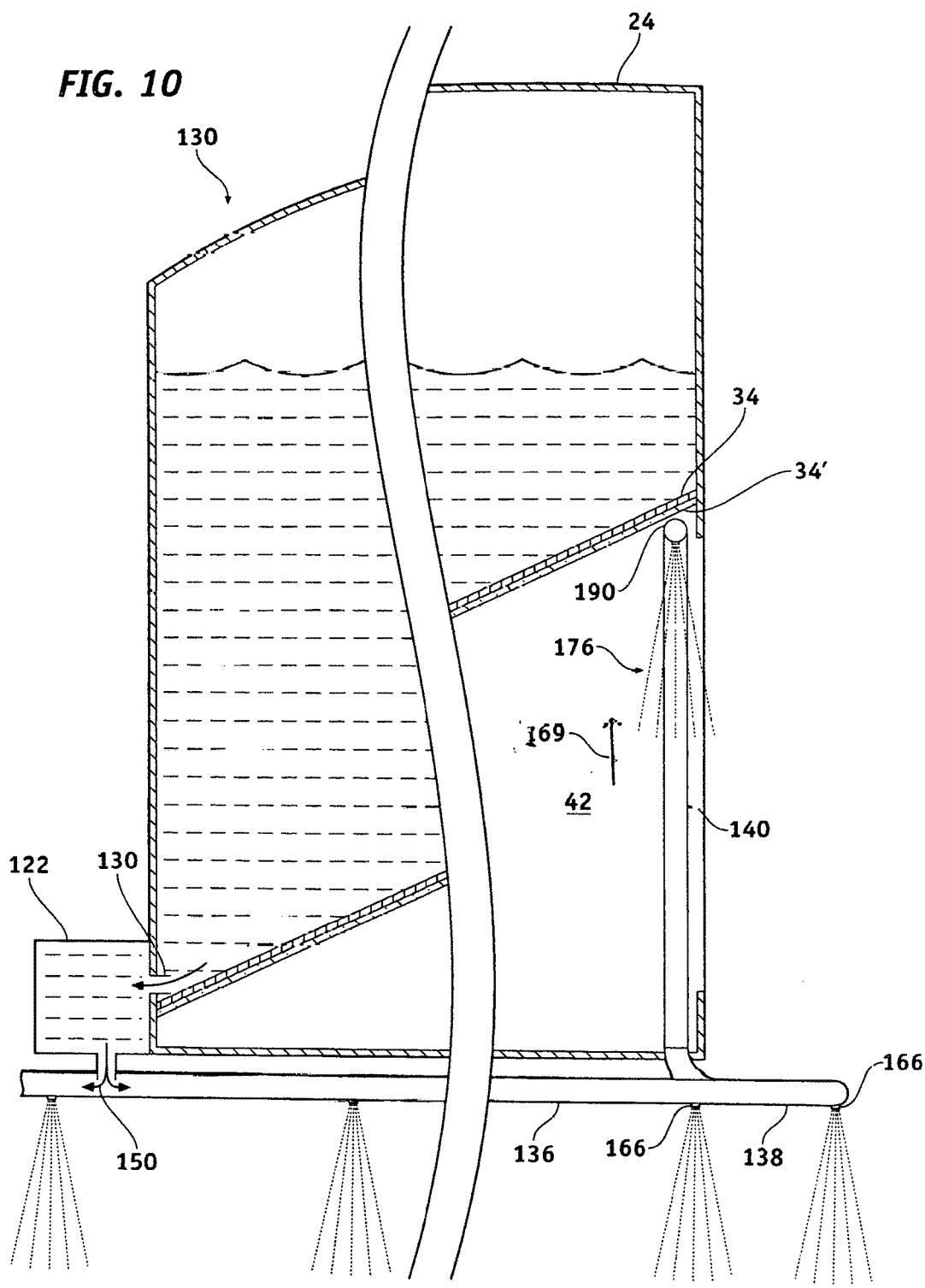
FIG. 10 a block diagram illustrating the water system of the present invention; and, FIG. 11 is a side elevational view of the embodiment shown in FIG. 1.

In order further reduce the pollution which might because by the escape of products of combustion from the combustion volume 42, it has been found advantageous to incorporate a water spray arrangement 130. For clarity, a semi-schematic block diagram of the water spray arrangement 130 is shown on FIG. 10. The water spray arrangement 130 incorporates a water pump 132 which receives water from the water tank 24 as indicated at 134. The water pump 132 pumps the water into an exterior water manifold 136 which has spray bar 138 which may if desired extend along both sides, the front and the rear of the chassis 12 and the spray bar 138 is external the combustion volume 42 and external the chassis 12 to spray water onto the ground 40 and the spray bar 138 may be mounted, for example, on the brackets 66. Water flows in the spray bar 138 in the direction indicated by the arrow 150. The spray bar 138 includes a plurality of spaced apart nozzles as indicated at 166 for spraying water therefrom.

The water spray arrangement 130 also has a transfer tube 140 for conducting water in the direction indicated by the arrow 169 of to a misting manifold 150 which extends transversely across the interior of the combustion volume 42 along the lower wall 34 of the water tank 24 adjacent to the entrance to the filter 90.

Figure 11:
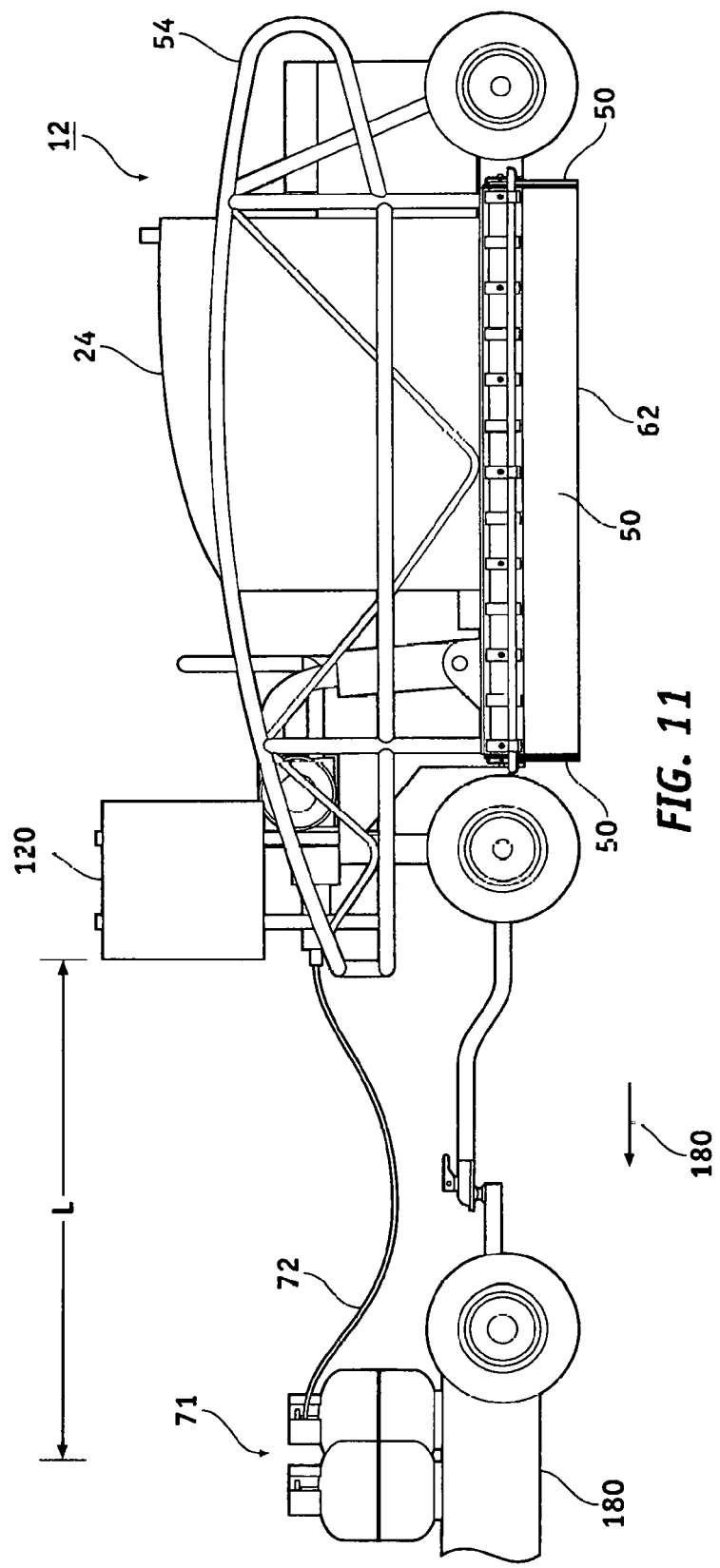

As indicated above, the chassis 112 in the embodiment 10 is a towed vehicle and may be attached to a towing vehicle 180 which moves the chassis 12 in the direction indicated by the arrow 186 during the incineration of the material on the ground 40. It has been found that a preselected separation indicated by the letter L on FIG. 11 is necessary to provide a safe distance between the liquified petroleum gas tanks 71 and the burner mixing chamber 62 and flames 70. The separation L is often specified by various regulations and codes.

This concludes the description of a preferred embodiment of the present invention. As shown above the present invention will provide substantially complete incineration serials on the ground to be incinerated as opposed to only scorching the ground surface.

Accordingly, those skilled in this art will appreciate that the embodiments discussed above are exemplary of the present invention. They are not, however, intended to limit the scope of the claims of this patent application. Many other substances and techniques, different from those discussed above, can be used. That is to say that all changes and modifications that come within the spirit of the present invention are intended to be protected by the following patent claims.

The invention claimed is:

1. A mobile field incinerating arrangement for incinerating materials on a ground surface comprising, in combination:

a mobile vehicle having a chassis, and said chassis having a forward end, a rear end spaced longitudinally from said forward end, a pair of transversely spaced apart sides extending between said forward end and said rear end, a top surface and a bottom surface spaced vertically downwardly from said top surface, and said chassis defining a substantially open chassis volume between said forward end, said back end, said pair of spaced apart sides, said top surface and said bottom surface;

a water tank mounted on said chassis, in said open chassis volume and said water tank having a bottom wall, a top wall spaced vertically upwardly therefrom said bottom wall, a pair of transversely spaced apart side walls extending between said water tank top wall and said water tank bottom wall, and said water tank having a front wall in regions adjacent said forward end of said chassis and a rear wall in regions adjacent said rear end of said chassis to define a closed water storage volume between said water tank top wall, said water tank bottom wall, said water tank front wall, said water tank back wall and said water tank side walls;

said bottom wall of said water tank having a front edge spaced a first preselected distance from the ground surface and a back edge spaced a second preselected distance greater than said first preselected distance from the ground surface, and said bottom wall of said water tank having an outer surface facing and spaced from the ground surface to define a wedge shaped incineration volume having a smaller vertical height in regions adjacent said forward end of said chassis and a larger vertical height in regions adjacent said rear end of said chassis;

a ceramic coating on said outer surface of said bottom wall of said water tank spaced from the ground surface;

a burner assembly having a mixing chamber mounted on said chassis at said forward end thereof, and said mixing chamber having an air inlet for receiving air, a fuel inlet for receiving fuel and a combustion manifold having a plurality of fuel nozzles in a transversely spaced apart array and said plurality of fuel nozzles for emitting flame directed towards the ground surface for providing incineration of the material on the ground surface;
said mixing chamber of said burner assembly rotatable about a transversely extending horizontal axis to selectively position said flame from said fuel nozzles in preselected separations respect to the ground surface;
a pair of exterior water manifolds coupled to said chassis extending longitudinally and one of said pair of exterior water manifolds mounted on each of said spaced apart sides of said chassis, and each of said exterior water manifolds of having a plurality of external water nozzles and said plurality of water nozzles extending longitudinally from regions adjacent the forward end of said chassis to regions adjacent the rear end of said chassis for dispensing water onto the ground surface in regions external and adjacent to the chassis;
a misting water manifold mounted in the said open chassis volume of said chassis and extending transversely across said open chassis volume in regions adjacent the rear edge of said bottom wall of said water tank and said misting water manifold having a plurality of misting water nozzles extending transversely across said chassis volume for dispensing a misting water spray towards the ground surface and into said chassis volume adjacent the rear end of said chassis;
a filter box mounted on said chassis in regions adjacent the rear end of said open chassis volume and extending transversely across said incineration volume for receiving and filtering products of combustion generated by the incineration of the materials on said ground surface to remove particulate matter therefrom.

2. The arrangement defined in claim 1 and said chassis further comprising:
all upper framework; and,
a bottom frame connected to said upper framework in vertically downwardly spaced apart relationship to said top surface of said chassis, and said bottom frame extending substantially around said open chassis volume.

3. The arrangement defined in claim 2 and further comprising:
a skirt arrangement having an upper portion coupled to said chassis on the external surface in regions adjacent the bottom surface of said chassis and said skirt arrangement having a lower portion spaced vertically downwardly from said upper portion of said skirt arrangement and said lower portion of said skirt arrangement having a lower edge in close proximity to the surface of the ground.

4. The arrangement defined in claim 3 wherein:
said skirt arrangement is flexible.

5. The arrangement defined in claim 1 wherein:
said skirt arrangement is a multilayer construction and having a flexible outer layer and a flexible inner layer and said flexible inner layer further comprising a layer of silicone and said flexible outer layer comprising one of a rubber layer and a thin copper sheet layer.

6. The arrangement defined in claim 5 wherein:
said skirt arrangement further comprises a pair of side skirts connected to said chassis intermediate said chassis and said external water nozzles.

7. The arrangement defined in claim 6 wherein:
said skirt arrangement further comprises a forward skirt extending transversely across said chassis adjacent the forward end thereof.

8. The arrangement defined in claim 6 wherein:
said skirt arrangement further comprises a rear skirt extending transversely across said chassis adjacent the rear and thereof and between said filter box and the ground.

9. The arrangement defined in claim 5 wherein:
said skirt arrangement is coupled to said bottom frame of said chassis.

10. The arrangement defined in claim 1 and further comprising:
an air blower mounted on said chassis adjacent the forward end thereof for providing an airflow into said mixing chamber of said burner assembly, and a flexible hose coupled to said air blower for providing an airflow from the air blower into said mixing chamber.

11. The arrangement defined claim 1 wherein:
said mobile vehicle is towed mobile vehicle.

12. The arrangement defined in claim 1 wherein:
said mobile vehicle is a self-propelled mobile vehicle.

13. The arrangement defined in claim 1 and further comprising:
a water pump mounted on said chassis and operatively connected to said water tank for receiving water from said water tank and pumping water to said external water manifold.

14. The arrangement defined in claim 13 wherein:
said water pump is operatively connected to said misting water manifold for transferring water from said water tank to said misting water manifold.

15. The arrangement defined in claim 14 and further comprising:
a front wheel arrangement rotatably mounted on said chassis in regions adjacent said forward end thereof and a rear wheel arrangement rotatably mounted on said chassis in regions adjacent said rear end thereof for supporting said chassis a preselected distance above the ground surface.

16. A mobile field incinerating arrangement for incinerating materials on a ground surface comprising, in combination:
a chassis having a forward end, a rear end spaced longitudinally from said forward end, a pair of transversely spaced apart sides extending between said forward end and said rear end, a top surface and a bottom surface spaced vertically downwardly from said top surface, and said chassis defining a substantially open chassis volume between said forward end, said back end, said pair of spaced apart sides, said top surface and said bottom surface said chassis further comprising an upper framework and a bottom frame coupled to said upper framework and extending peripherally therearound and said bottom frame having an external surface;
said bottom frame having a pair of spaced apart side frame members extending longitudinally from said forward end of said chassis to said rear end of said chassis, a forward frame member in regions adjacent said forward end of said chassis and extending between said pair of side frame members and a rear frame member spaced longitudinally from said front frame member and extending between said side frame members in regions adjacent said rear end of said chassis;
a flexible skirt arrangement having an upper portion coupled to said bottom frame on said external surface of said bottom frame and said skirt arrangement having a lower portion spaced vertically downwardly from said upper portion of said skirt arrangement, and said lower portion of said skirt arrangement having a lower edge in close proximity to the surface of the ground;

said flexible skirt arrangement having a side skirts coupled to each of said side members of said lower frame, a forward skirt coupled to said forward frame member and a rear skirt coupled to said rear frame member;

a water tank mounted on said chassis, in said open chassis volume and said water tank having a plurality of walls defining a water storage volume, and one of said plurality of water tank walls comprising a bottom wall positioned in opposed relationship to the ground to be incinerated;

said bottom wall of said water tank having a front edge spaced a first preselected distance from the ground surface and a back edge spaced a second preselected distance greater than said first preselected distance from the ground surface, and said bottom wall of said water tank defining a wedge shaped incineration volume between said bottom wall of said water tank and the ground surface to be incinerated to define and incineration volume having a smaller vertical height in regions adjacent said forward end of said chassis and a larger vertical height in regions adjacent said rear end of said chassis;

a ceramic coating on said bottom wall of said water tank facing the ground surface;

a burner assembly rotatably mounted on said chassis for limited rotational movement thereon about a transversely extending horizontal axis at said forward end of said chassis, and said burner assembly having a combustion manifold having a plurality of fuel nozzles in a transversely spaced apart array and said plurality of fuel nozzles for emitting flame directed towards the ground surface for providing incineration of the material on the ground surface;

a pair of exterior water manifolds coupled to said side members of said bottom frame, and each of said exterior water manifolds of having a plurality of external water nozzles and said plurality of external water nozzles extending longitudinally from regions adjacent the forward end of said chassis to regions adjacent the rear end of said chassis in spaced apart array for dispensing water onto the ground surface in regions external and adjacent to said chassis;

a misting water manifold mounted in said upper framework of said chassis and extending transversely across said open chassis volume in regions adjacent the rear edge of said bottom wall of said water tank and said misting water manifold having a plurality of misting water nozzles extending transversely across said chassis volume for dispensing a misting water spray towards the ground surface and into said chassis volume adjacent the rear end of said chassis.

17. The arrangement defined in claim 16 wherein:
said flexible skirt arrangement is a multilayer construction having a flexible outer layer comprising one of a rubber layer and a thin copper sheet layer and a flexible inner layer comprising a layer of silicone on said flexible outer layer.

18. The arrangement defined in claim 16 and further comprising:
a water pump mounted on said chassis and operatively connected to said water tank for receiving water therefrom and pumping water to said exterior water manifolds and said misting water manifold.

19. The arrangement defined in claim 18 and further comprising:
an air blower mounted on said chassis for providing an airflow into said burner assembly and a flexible hose coupled to said air blower and said burner assembly for transmitting airflow into said burner assembly.

20. The arrangement defined in claim 16 wherein:
said mobile vehicle is a towed vehicle;
and further comprising a towing vehicle connected to said mobile vehicle for moving said mobile vehicle in a preselected path over the ground to be incinerated;
said towing vehicle having at least a fuel support portion thereof a preselected distance from said burner assembly and said preselected distance is on the order of 10 feet;
a tank assembly of liquified petroleum gas mounted on said fuel support portion of said towing vehicle.

* * * * *